United States Patent
Vanark et al.

[11] Patent Number: 5,887,393
[45] Date of Patent: Mar. 30, 1999

[54] PLASTIC GLAZING WINDOW MODULE

[75] Inventors: Virginia C. Vanark, Mishawaka; Michael D. Kobrehel, Elkhart, both of Ind.

[73] Assignee: Excel Industries, Inc., Elkhart, Ind.

[21] Appl. No.: 812,349

[22] Filed: Mar. 5, 1997

[51] Int. Cl.$^6$ .............................. E06B 3/54; E06B 7/00; B32B 3/60
[52] U.S. Cl. .................. 52/208; 52/204.591; 52/204.62; 296/901; 428/195; 428/410
[58] Field of Search ................... 296/197, 210, 296/901; 52/208, 204.591, 204.5, 204.62; 428/195, 409, 410, 412

[56] References Cited

U.S. PATENT DOCUMENTS

| | | | |
|---|---|---|---|
| 3,895,859 | 7/1975 | Yoshida et al. | 350/726 |
| 4,101,159 | 7/1978 | Stewart | 296/210 |
| 4,109,044 | 8/1978 | Marriott | 428/210 |
| 4,571,278 | 2/1986 | Kunert | 156/108 |
| 4,635,420 | 1/1987 | Batky . | |
| 4,968,543 | 11/1990 | Fujioka et al. | 428/31 |
| 5,028,759 | 7/1991 | Finley | 219/203 |
| 5,033,788 | 7/1991 | Raj | 296/136 |
| 5,035,096 | 7/1991 | Ohtake et al. . | |
| 5,154,028 | 10/1992 | Hill et al. . | |
| 5,189,952 | 3/1993 | Ohmura et al. | 101/211 |
| 5,339,584 | 8/1994 | Ohtake et al. | 52/208 |
| 5,419,088 | 5/1995 | Raymond et al. . | |
| 5,437,131 | 8/1995 | Tamura | 52/716.6 |
| 5,443,673 | 8/1995 | Fisher et al. | 156/245 |
| 5,475,956 | 12/1995 | Agrawal et al. | 52/208 |
| 5,498,475 | 3/1996 | Takigawa et al. | 428/334 |
| 5,558,387 | 9/1996 | Sumida et al. | 296/93 |
| 5,635,281 | 6/1997 | Agrawal | 428/192 |
| 5,641,558 | 6/1997 | Noda et al. | 428/210 |
| 5,665,397 | 9/1997 | Fisher et al. | 425/116 |
| 5,704,173 | 1/1998 | Repp et al. | 52/204.62 |
| 5,707,473 | 1/1998 | Agrawal et al. | 156/245 |
| 5,741,043 | 4/1998 | Palajac et al. | 296/201 |
| 5,763,050 | 6/1998 | Hirmer | 296/210 X |

*Primary Examiner*—Robert Canfield
*Attorney, Agent, or Firm*—Banner & Witcoff, Ltd.

[57] ABSTRACT

A plastic glazing window module has a glazing assembly formed from a transparent plastic glazing substrate and a frit film positioned on at least a portion of the glazing substrate. In certain preferred embodiments the transparent plastic substrate is a polycarbonate, and the frit film is a semi-rigid sheet having a transparent carrier web with a non-transparent ink or dye. In certain embodiments the frit film is positioned on an interior side of the plastic substrate and the non-transparent portion covers the attachment means from exterior view. An abrasion resistant coating or hardcoat, such as an organically modified ceramic, is preferably applied to each surface of the glazing assembly, preferably by dip coating. In certain preferred embodiments structural ribs may be positioned circumferentially around the substrate. The glazing substrate also may form a lip to cover a ledge formed by the motor vehicle body at the periphery of the window opening. In certain preferred embodiments complex curvo-planar shapes may be formed, enhancing exterior styling options. The plastic glazing window modules may optionally be positioned flush with an exterior surface of the motor vehicle.

32 Claims, 5 Drawing Sheets

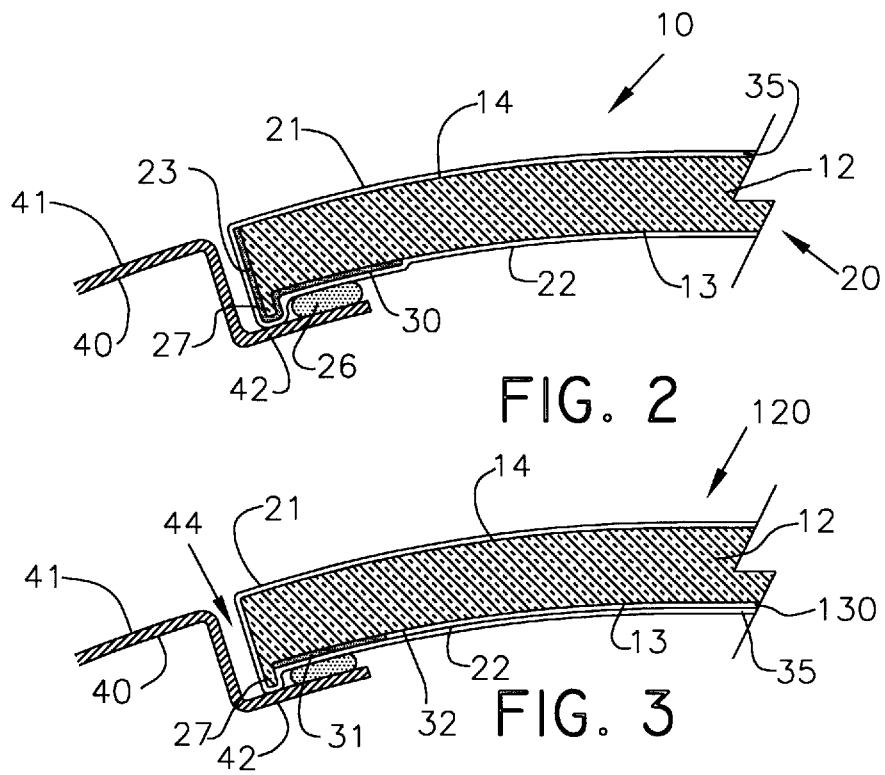
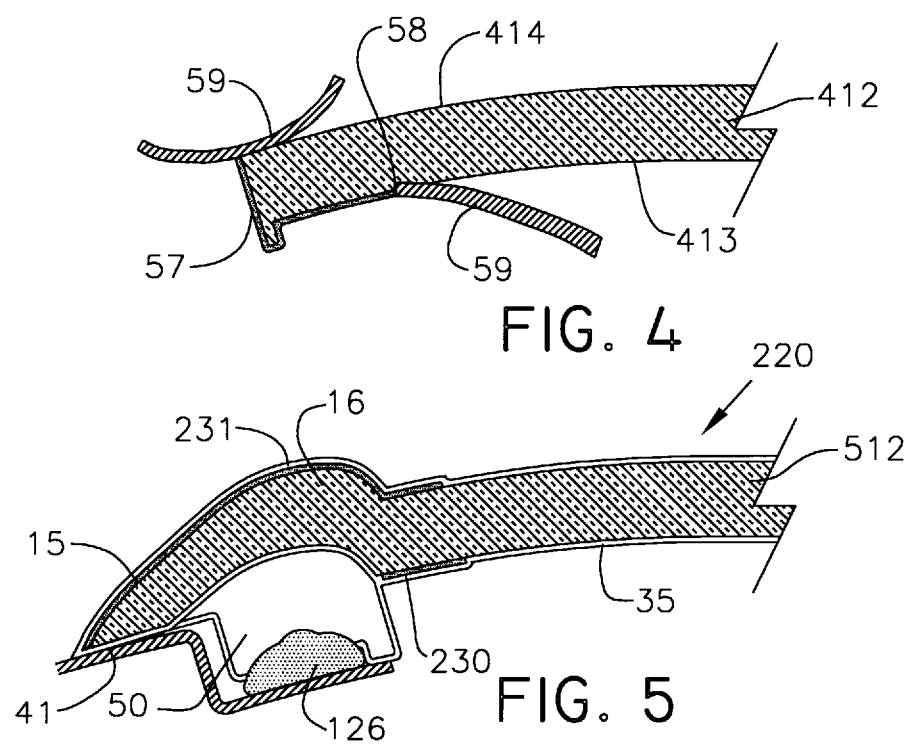

PLASTIC GLAZING WINDOW MODULE

FIELD OF THE INVENTION

The present invention generally relates to improved window designs incorporating plastic glazing, and more particular to plastic glazing modules suitable for use in motor vehicles.

BACKGROUND OF THE INVENTION

Glass window modules commonly used in the automotive industry typically comprise a sheet of glass, often bent into a curvo-planar shape, an encapsulation material such as a reaction-injection-molded (RIM) polyurethane or a polyvinyl chloride (PVC) positioned around a peripheral edge of the glass, and attachment means for securing the module to a motor vehicle. Often a primer is needed to enhance the bonding between the glass and the encapsulation material.

The automotive glass used in window modules is manufactured in flat sheets. The flat sheets are cut to size and optionally a frit is applied, typically around the periphery of the glass. Frit is important for decoration and exterior styling, principally to hide from view what may be positioned behind the frit, such as, for example, attachment means for securing the window module to a motor vehicle body panel, etc. Frit is normally applied by a silk-screen process to the flat sheets of glass. The frit is applied to the glass and then heated to cure the frit and bond it to the glass. The frit used in automotive applications is typically glass in particulate form, such as a bismuth-borosilicate glass particulate, generally of controlled size distribution, with a liquid carrier, and a non-transparent additive such as an iron oxide to produce an opaque dark color and act as the covering agent.

The glass is bent into shape in accordance with techniques known to those skilled in the art, either by the traditional gravity sag method in a lehr or by the more recently developed press bend techniques wherein the glass is heated sufficiently to be formed to a contoured surface. These flat glass manufacturing and forming techniques are energy intensive and consequently have undesirable costs. Furthermore, there are limitations on how far flat glass can be bent without introducing unacceptable optical distortions and/or high stresses which might cause the glass to fail.

Plastic glazing modules have been considered as a replacement for glass window modules in automotive applications. One of the principal identified advantages is weight reduction, with correspondingly improved vehicle fuel economy. Additionally, window modules having transparent polymeric materials such as acrylics and polycarbonates allow complex bends and curvo-planar shapes impractical or unacheivable by conventional glass modules while maintaining required properties such as clear optics, low and substantially uniform stress, and reduced weight. The change from glass to plastic glazing panels however, introduces new problems such as frit application, scratch resistance and control of the molding process. One recently attempted solution for some of the problems of plastic glazing window modules is shown in U.S. Pat. No. 5,035,096 to Ohtake et al. Ohtake et al shows a synthetic resin windowpane having a window body portion and a frame portion. The frame portion is hollowed out by a gas-assist injection molding process. This design has various disadvantages. The injection molding process producing the window shape has to be carefully controlled to prevent areas of high stress from developing in the part, especially around the perimeter of the window body portion where it joins the frame portion. Such stresses can lead to optical distortions and aesthetically unappealing deformities. Also, use of a gas-assist injection molding technique can produce non-uniform wall thicknesses producing localized high stress areas which lead to optical distortions, surface dimples or other unattractive exterior deformities.

Plastic glazing modules have other problems not anticipated or identified with glass modules. Transparent plastics are susceptible to scratching and other damage, e.g., clouding resulting from prolonged exposure to ultraviolet (UV) radiation. UV stabilizers can be applied to or incorporated into the plastic glazing, as well as an abrasion resistant material or hardcoat to resist scratching. Ohtake et al suggests a hardcoat painted onto the window body portion and an opaque layer painted onto an exterior side of the frame portion to hide the hollowed out portion behind it. This is disadvantageous for at least the following reasons. First, the opaque layer on the frame portion is subjected to the elements and may be scratched off or flake off, potentially exposing the transparent substrate below. Second, the hardcoat does not cover the interior of the window module, creating the potential for scratching on the interior. Third, each surface has a different gloss or shininess: the paint on the exterior of the motor vehicle has a first gloss; the opaque layer has a second gloss; and the abrasion resistant coating has a third gloss. Three different glosses so close to one another produces an aesthetically unappealing striped appearance to the exterior of the vehicle. Fourth, the abrasion resistant material or hardcoat is typically the most expensive (by volume) material in a plastic glazing module, and a painting process can waste significant amounts of hardcoat material.

Another problem with plastic glazing modules is that traditional frit used on glass cannot be used on the non-flat surfaces demanded for current automotive window applications in that bleeding of the frit can occur. Moreover, to cure the frit the window module is heated to temperatures which can damage the plastic glazing substrate. Painting a frit-like material onto a plastic glazing substrate introduces additional problems, as the paint can be difficult to accurately control and it can be difficult to produce aesthetically acceptable patterns such as a gradual fade. Furthermore, it may be difficult to ensure proper bonding between the paint and the plastic substrate. It would be highly advantageous to produce plastic glazing for motor vehicle applications having a suitable frit-like material having an aesthetically pleasing appearance and allowing stylistic freedom in creating patterns.

Another problem with the use of transparent plastics as a replacement for glass in windows is that the tensile strength of the available transparent plastics is significantly less than glass. Uneven material thicknesses can stress the plastic glazing and produce optical distortions and aesthetically unappealing dimples on the surfaces of the module. This problem is particularly apparent near mechanisms that are embedded or otherwise secured to the transparent plastic, such as attachment means used to attach the glazing module to a motor vehicle body. In conventional automotive glass window modules attachment mechanisms often comprise adhesives at the perimeter of the glazing with a series of spaced mounting studs. If such a technique were used with a plastic glazing module, the unsupported area of the plastic glazing between the mounting studs can bow away from the adhesive bonding. Furthermore, dimples or depressions can appear on the exterior surface of plastic glazing modules employing mounting studs either directly embedded in the transparent plastic or embedded in an encapsulation material.

In view of the foregoing, it is an object of the present invention to provide a plastic glazing module of superior design. It is an additional object, at least in preferred embodiments, to provide a plastic window module of reduced cost and complexity while enhancing manufacturability. It is another object of the present invention, at least in certain preferred embodiments, to provide a plastic glazing window module that is highly reliable in operation. It is another object of the invention to provide a method for producing a plastic glazing window module.

SUMMARY OF THE INVENTION

There is provided a plastic glazing window module suitable for closing an opening in a motor vehicle, comprising a glazing assembly formed from a transparent plastic glazing substrate and a frit film. The frit film is positioned on at least a portion of the glazing substrate, and has a carrier web with a generally non-transparent area. The plastic glazing can be injection molded onto a frit film. More specifically, at least a selected area of the carrier web is substantially non-transparent or opaque. The corresponding region of the plastic glazing substrate can therefore, act as a sight shield for example, for componentry such as attachment means for securing the glazing assembly to the motor vehicle. The exterior surface of the glazing assembly preferably has uniform gloss and may be positioned generally flush with the motor vehicle, that is, aligned with the surrounding exterior surface of the motor vehicle.

As noted above, the frit film can be used to stylishly conceal objects positioned behind it. In typical automotive applications this means hiding from exterior view attachment means for securing the glazing assembly to the motor vehicle, as well as other components of the motor vehicle near the edge of the glazing assembly. The frit film of the plastic glazing window modules disclosed herein preferably is a semi-rigid sheet carrying a non-transparent ink or dye (i.e, the frit film is substantially self-supporting and non-destructively bendable in the free state prior to being integrated with the transparent glazing substrate). The non-transparent material can be transferred in-mold from a polyester film to the carrier web in accordance with die-transfer techniques well known to those skilled in the art. The carrier web preferably is a vinyl or a polycarbonate plastic. Advantageously, the non-transparent portion of the frit film can be accurately controlled, allowing for styling freedom to produce aesthetically appealing designs, such as, for example, a transition semi-transparent portion or a gradual fade from the transparent portion to the non-transparent portion. The frit film can be incorporated as an integral part of the plastic glazing window module as a sheet covering at least a portion, typically a peripheral portion of an interior side of the plastic glazing substrate, with the non-transparent portion positioned to cover and hide attachment means securing the glazing assembly to the motor vehicle. Optionally, the frit film can be cut to remove a center portion, leaving a peripheral portion to be bonded to the plastic substrate.

In accordance with another aspect of at least certain preferred embodiments structural ribs may be incorporated into the plastic glazing substrate, advantageously allowing the option of having the glazing assembly cover a ledge of a motor vehicle opening.

Use of an injection molded transparent plastic glazing substrate in a plastic glazing window module allows for complex curvo-planar shapes not practical with glass, such as for example curvature in three generally orthogonal curvo-planar portions of the module to meet in a "suitcase corner". This advantageously increases options available for exterior styling of motor vehicles.

In accordance with certain preferred methods of making the plastic glazing window modules disclosed here, a frit film having a carrier web with a generally non-transparent area and which is semi-rigid in the free state is inserted into a mold cavity of a mold, the mold is closed and a transparent plastic resin is injected into the mold cavity. The frit film and the transparent resin form a glazing assembly. The glazing assembly is then removed from the mold and coated with an abrasion resistant material and an adhesive strip is applied. The frit film can be placed in a mold cavity and optionally die-cut to remove a center portion. The frit film can optionally be heated and vacuum formed to the desired shape. The plastic glazing substrate is then injection molded into the cavity, thereby incorporating the frit film into the resulting glazing assembly.

In accordance with certain alternative methods of making the plastic glazing window modules disclosed here, a transparent plastic glazing substrate can be injection molded into a mold cavity, producing a glazing substrate having a notch for selectively applying paint or the like to the glazing substrate. The notch acts as a locator to ensure consistency and repeatability of an aesthetically appealing painted surface.

Preferably an abrasion resistant coating or hardcoat is applied to the glazing assembly, most preferably as an all over coating such as by dip coating the glazing assembly in the liquid hardcoat solution, followed by drying or otherwise curing the hardcoat. Advantageously, this process coats each surface of the glazing assembly, producing an aesthetically appealing uniform gloss over the entire surface while also in one operation providing scratch protection for both the exterior and interior surfaces.

It should be understood that the term "transparent", as used in this application with regard to the frit film and the transparent glazing substrate does not mean that the plastic glazing modules must allow 100% of solar energy received to pass through to the interior of the motor vehicle. Nor does the term "non-transparent" require the complete blockage of solar radiation. Rather, transparent as applied to the plastic glazing substrate and frit film simply means that a person with normal vision can readily see objects behind the film and the substrate, and non-transparent means that a person generally cannot see through or behind such film or substrate.

From the foregoing disclosure and the following more detailed description of various preferred embodiments it will be apparent to those skilled in the art that the present invention provides a significant advance in the technology and art of plastic glazing window modules. Particularly significant in this regard is the potential the invention affords for simplifying manufacturing steps and complexity. Additional features and advantages of various preferred embodiments will be better understood in view of the detailed description provided below.

BRIEF DESCRIPTION OF THE DRAWINGS

FIG. 2 is a cross sectional view of a preferred embodiment of a plastic glazing window module partially broken away and installed as in FIG. 1, corresponding to a view taken along line A—A in FIG. 1, with the exterior surface of the glazing assembly positioned generally flush with the exterior surface of the motor vehicle.

FIG. 3 is a cross sectional view of an alternative preferred embodiment of a plastic glazing window module corresponding to the view in FIG. 2.

FIG. 4 is a cross sectional view of an alternative preferred embodiment of a plastic glazing window module showing masks to cover a plastic glazing substrate while a paint is applied.

FIG. 5 is a cross sectional view of an alternative preferred embodiment of a plastic glazing window module wherein the plastic glazing substrate has a series of interior structural ribs, and the frit film is positioned on the interior side and the exterior side of the transparent plastic glazing.

Figure 1:
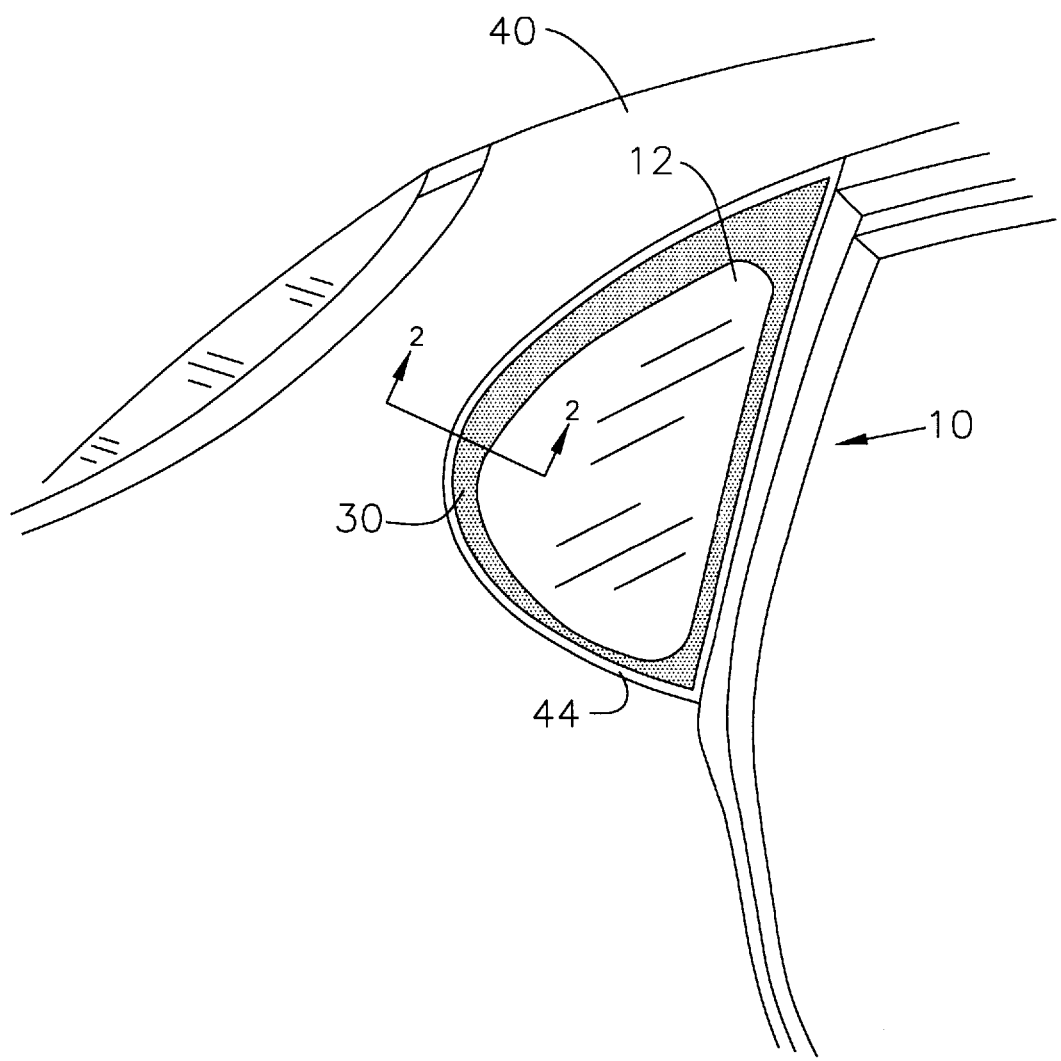
FIG. 1 is an exterior perspective view of a plastic glazing window module for a motor vehicle, shown installed in a motor vehicle body opening.

It should be understood that the appended drawings are not necessarily to scale, presenting a somewhat simplified representation of various preferred features illustrative of the basic principles of the invention. The specific design features of the plastic glazing window modules disclosed here, including, for example, the cross sectional thickness of the transparent plastic substrate, the specific composition of the fit film, the hardcoat and the encapsulation material will be determined in part by the particular intended application and use environment. Certain features of the illustrated embodiments have been enlarged or distorted relative to others to facilitate visualization and clear understanding. In particular, thin features may be thickened for clarity of illustration, as for example the abrasion resistant coating. All references to direction and position, unless otherwise indicated, refer to the orientation of the window module illustrated in the drawings. In general, lateral or laterally refers to a rightward or leftward direction in the plane of the paper in FIG. 1, and up, down or vertical refers to corresponding directions in the plane of the paper in FIG. 1. The same reference numerals are used in the drawings to identify identical features of different preferred embodiments.

DETAILED DESCRIPTION OF CERTAIN PREFERRED EMBODIMENTS

It will be apparent to those skilled in the art, that is, to those who have knowledge or experience in this area of technology, that many design variations are possible for the plastic glazing window modules disclosed herein. The following detailed discussion of various alternative and preferred features and embodiments will illustrate the general principles of the invention with reference to a plastic glazing window module suitable for use in a motor vehicle. Other embodiments suitable for other applications will be apparent given the benefit of this disclosure.

Referring now to the drawings, FIG. 1 is a perspective view of a fixed plastic glazing window module 10 positioned behind a rear door for closing a motor vehicle opening 44 in accordance with a preferred embodiment. Such fixed windows are often referred to as quarter windows. FIGS. 2–5 show cross sectional views of alternative preferred embodiments of plastic glazing window modules corresponding to a view taken along line 2—2 in FIG. 1. FIG. 2 shows a preferred embodiment of a plastic glazing window module comprising a transparent plastic glazing substrate 12, having an interior side 13, an exterior side 14, and a perimeter side 23; a frit film 30, with the substrate injection molded onto the frit film to form a glazing assembly 20; an abrasion resistant coating 35 and an adhesive 26 for securing the glazing assembly 20 to the motor vehicle wall 40. A circumferential perimeter of the substrate can include a portion of the perimeter side 23, a portion of the interior side 13 near the perimeter side, and a portion of the exterior side 14 near the perimeter side. The transparent plastic glazing substrate 12 includes a transparent plastic and may also include UV stabilizers. Suitable transparent plastics include, e.g., polymethyl methylacrylates (acrylics) and polycarbonates. Polycarbonates, which are a polyester of carbonic acid, generally have better impact strength than acrylics and have good mold shrinkage and creep characteristics. Other suitable transparent plastics will be apparent to those skilled in the art in view of this disclosure.

The glazing assembly 20 has an exterior surface 21, and an interior surface 22. Advantageously the plastic glazing window module may be positioned generally flush with an exterior surface 41 of the motor vehicle wall 40 as shown in FIGS. 2 and 3, that is, exterior surfaces of the glazing assemblies may be generally aligned with the exterior surface of the motor vehicle. In FIG. 3 the glazing assembly 120 is adhesively attached to a peripheral ledge 42 of the motor vehicle wall 40. An optional flange 27 of plastic glazing substrate extends to meet the ledge 42 to guide the glazing so that it is substantially flush with the exterior surface of the wall 40.

In accordance with current customer demands regarding exterior styling, the glazing assembly is preferably curvoplanar, and more specifically has curves which follow the curve of the sheet metal 40 of the motor vehicle near the motor vehicle ledge 42. Advantageously complex curvoplanar shapes may be achieved by the plastic glazing window modules disclosed here, and are described in greater detail below.

In a highly advantageous feature, frit film 130 of FIG. 3 comprises a semi-rigid sheet of an otherwise transparent carrier web of polycarbonate or vinyl having a non-transparent area 31. The non-transparent area preferably comprises an ink or dye which is transferred to the carrier web from a polyester film using an in-mold transfer technique in accordance with methods known to those skilled in the art. It will be within the ability of those skilled in the art to adapt such known methods to the making of frit film for the present invention given the benefit of the present disclosure. Advantageously for exterior styling, the non-transparent area 31 of the frit film 130 can be controlled with excellent accuracy by such methods. In certain preferred embodiments such as FIG. 3 the carrier web also has a transparent portion 32, typically positioned on the main body portion of the substrate radially inward of the non-transparent portion. Examples of polycarbonates suitable for use as a carrier web of a frit film include Makrolon"TM" from Bayer Corporation, Pittsburgh, Pa. Such preferred frit film readily bonds to the injection molded plastic substrate 12 so as to be embedded therein to form a laminated curvo-planar shaped glazing assembly.

The frit film is preferably positioned on the interior side 13 of the transparent plastic substrate 12, with the non-transparent portion covering and hiding the attachment adhesive and the peripheral motor vehicle ledge 42. As seen in the preferred embodiment of FIG. 3, the frit film 130 may comprise a solid sheet covering all or nearly all of the interior side 13 of the transparent plastic substrate 12. Alternatively, as seen in the preferred embodiment of FIG. 2, most or all of the transparent portion can be removed, for example, by a die-cut technique, leaving principally the non-transparent portion. In certain preferred embodiments such as FIG. 2, the frit film may be heated and vacuum formed to contact the interior side and at least a part of the perimeter side 23 of the glazing substrate. Optionally the frit film in each of these embodiments can have a transition semi-transparent portion between the non-transparent area and the transparent area, allowing for a significant degree of styling freedom. Alternative frit film materials, cutting methods and bonding techniques will be apparent to those skilled in the art given the benefit of this disclosure.

Since transparent plastic glazing in general and polycarbonate in particular is susceptible to scratches, it is preferable to apply an abrasion resistant coating 35 or hardcoat. Preferably the hardcoat is applied in liquid solution form. Most preferably the glazing assembly 20 is spray coated, flow coated or dip coated. In dip coating, the glazing assembly is dipped into liquid hardcoat solution. Advantageously, the excess material is recovered and reused, as the hardcoat is generally the most expensive component by volume of the encapsulated plastic glazing window module. Coating each surface of the glazing assembly advantageously produces a uniform gloss across the module, greatly enhancing its aesthetics. The hardcoat can greatly increase light transmittal through the encapsulated plastic glazing window module in response by a standard Taber abrasion test known to those skilled in the art. Polysiloxanes are suitable as hardcoat materials. More preferred are organically modified ceramics, such as Ormocer"TM" available from Bayer Corp. In accordance with a highly advantageous feature of a preferred embodiment, organically modified ceramics disclosed here use are preferred for use as a dip-coated hardcoat on encapsulated plastic glazing window modules. Such organically modified ceramics differ from siloxane coatings in that their curing involves polymerization of organic components in addition to the condensation of inorganic constituents. In the finished hardcoat, the organic components are bound to the inorganic network by silicon-carbon bonds. The two component system of organically modified ceramics bonds well to the plastic substrate and to the frit film of the preferred embodiments disclosed above. Other suitable hardcoat materials and methods of application will be apparent to those skilled in the art given the benefit of this disclosure.

Figure 6:
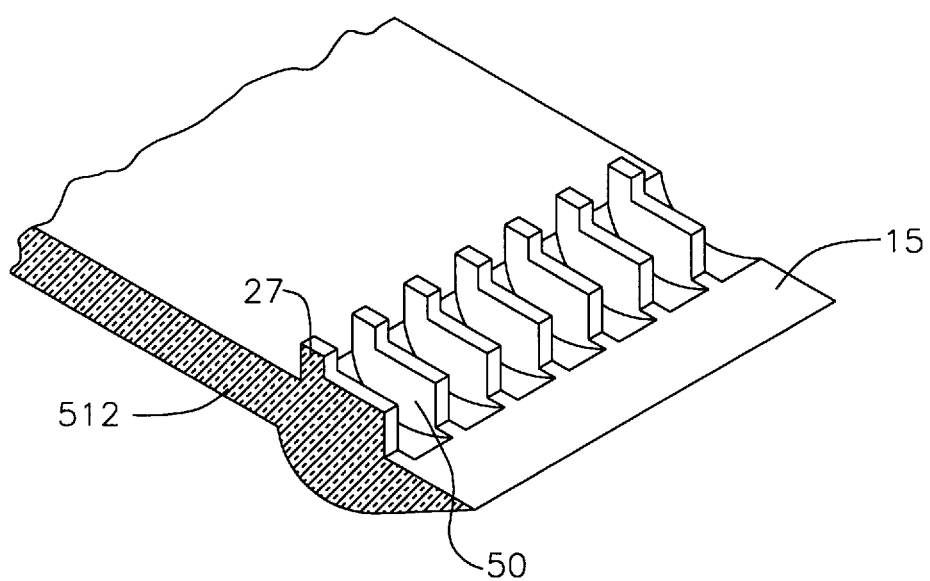
FIG. 6 is a perspective view of the interior surface of the plastic glazing substrate of the glazing assembly of FIG. 5, enlarged and partially broken away, showing the structural ribs.

FIGS. 5 and 6 show a non-flush preferred embodiment of a plastic glazing window module having an alternative styling option. The transparent plastic glazing substrate 512 has radially extending structural ribs 50 spaced circumferentially around and preferably unitary with the substrate 512, most preferably positioned on the interior side of the substrate. A lip 15 extends from a main body of the glazing substrate over the ledge 42 of the motor vehicle onto the exterior surface 41. Frit film 230, 231, having a non-transparent area is positioned on the interior side and exterior side, respectively, of the glazing substrate to shield the ribs and attachment means 126 from exterior view. Preferably, to reduce or eliminate sink marks on the surfaces of the glazing assembly the ribs 50 have a cross sectional thickness in the range of 25 to 50 percent of the cross sectional thickness of the portion 16 of the lip 15 above the ribs, most preferably about 30%. Other configurations extending from the main body of the plastic glazing substrate to provide strengthened structure to the glazing assembly will be apparent to those skilled in the art given the benefit of this disclosure.

Figure 7:
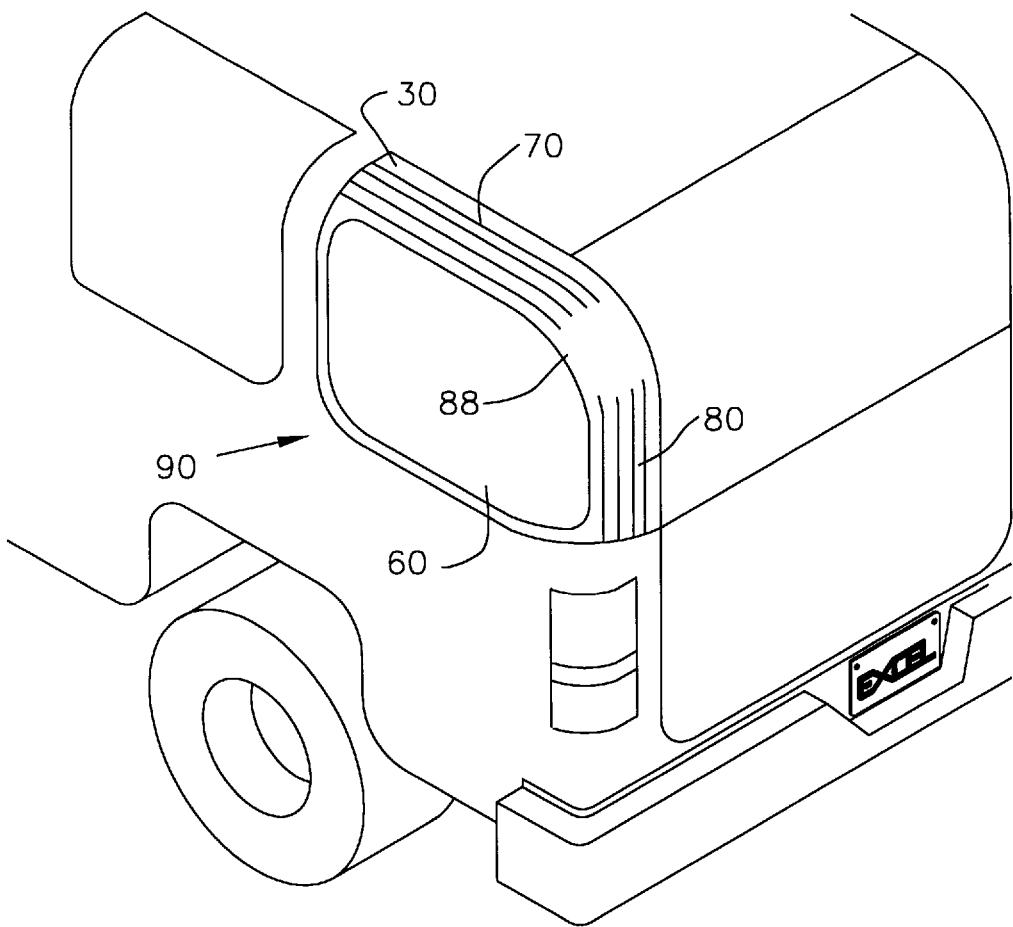
FIG. 7 is a perspective view of an alternative preferred embodiment of a plastic glazing window module positioned in a motor vehicle showing a module having three generally orthogonal portions meeting in a suitcase corner.
Figure 8:
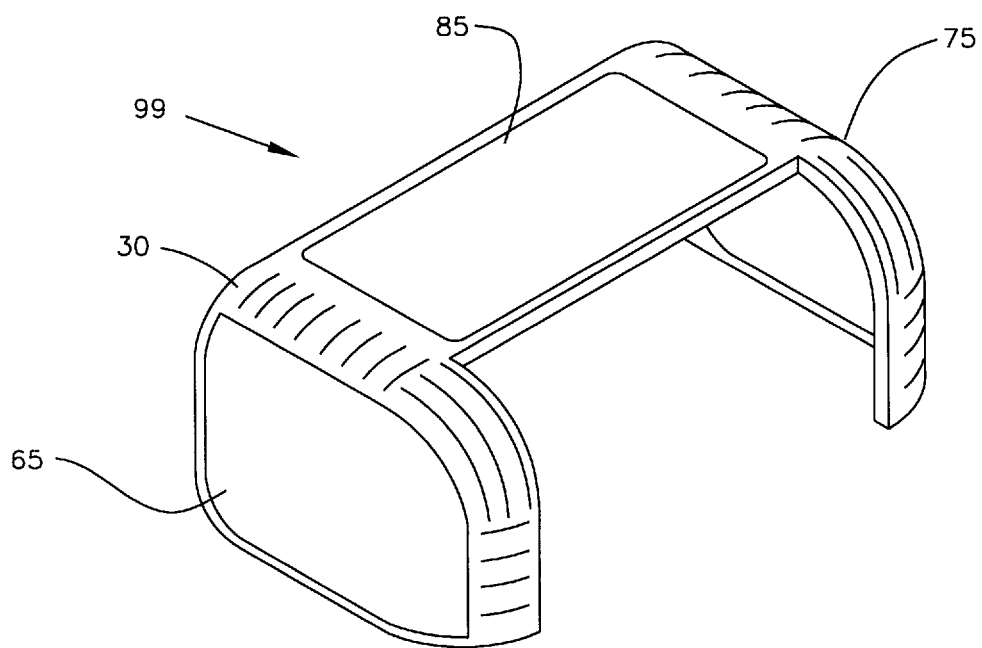
FIG. 8 is a perspective view of an alternative preferred embodiment of a plastic glazing window module showing a unitary module integrating a sunroof portion with left and right side window portions.

As shown in FIGS. 7 and 8, the use of transparent plastic glazing advantageously allows for complex curvo-planar shapes, such as saddle shapes or other shapes where two or more portions of the transparent plastic glazing substrate are positioned at generally right angles to at least one other portion of the plastic glazing substrate, optionally meeting in a radiused curve. Optionally, as shown, for example, in FIG. 7, a plastic glazing module 90 can have three such generally orthogonal curvo-planar glazing substrate portions 60, 70, 80. Each such curvo-planar portion can meet the two other portions such that all three portions meet in a suitcase corner 88, i.e, a rounded three-dimensional curve. The non-transparent area of the frit film 30 may be positioned on the complex curvo-planar shape as desired to enhance the aesthetic appearance of the module.

In accordance with a method of making a plastic glazing window module, a semi-rigid sheet of frit film may be inserted into a mold cavity, preferably aligned with alignment tabs or other suitable alignment means, and a transparent plastic resin can be injection molded into the mold cavity to contact the frit film to form a glazing assembly. Optionally, the frit film may be cut to size with a die punch, either before insertion into the mold cavity or in-mold, leaving, for example, a peripheral portion of frit film as shown in FIG. 2. If the window module has a complex curvo-planar shape or other irregularities, the frit film may be heated and vacuum formed to the desired shape, and then the plastic resin is shot behind the frit film. After the glazing assembly is formed, it can be removed from the mold and a hardcoat may be applied. Preferably the hardcoat is applied by dip coating the glazing assembly in a solution of the hardcoat material. Once the part has sufficiently cooled, an adhesive may be applied to the interior surface of the glazing assembly.

In accordance with an alternative method of making a plastic glazing window module illustrated in FIG. 4, a transparent plastic resin is injected into a mold cavity to form a transparent plastic glazing substrate 412 having a notch 58, optionally positioned on the interior side 413 of the substrate near the perimeter of the substrate. Masks 59 guided by the notch 58 shield a first portion of the glazing substrate. A paint 57 can then be accurately applied to a second portion. The paint and the substrate form a glazing assembly having a precisely controlled and aesthetically appealing sharp transition between non-transparent paint and the transparent glazing substrate 512. Optionally the mask may be perforated to form a gradual transition from non-transparent to transparent. When the paint has dried an abrasion resistant hardcoat may be applied to the glazing assembly, preferably by dip coating the glazing assembly in the manner described above. Other suitable methods of making a plastic glazing window module will be apparent to those skilled in the art given the benefit of this disclosure.

From the foregoing disclosure and detailed description of certain preferred embodiments, it will be apparent that various modifications, additions and other alternative embodiments are possible without departing from the true scope and spirit of the invention. For example, plastic glazing modules may have patterns on frit film tailored to individual tastes. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A plastic glazing window module for a motor vehicle having an exterior surface comprising, in combination:

a glazing assembly having an exterior surface and an interior surface, comprising a transparent plastic glazing substrate having a main body, an interior side, an exterior side and a perimeter, and a frit film positioned on at least a portion of the glazing substrate, the frit film having a carrier web with a generally non-transparent area.

2. The plastic glazing window module of claim 1 further comprising attachment means for attaching the glazing assembly to a motor vehicle.

3. The plastic glazing window module of claim 2 wherein the attachment means comprises a circumferential adhesive strip.

4. The plastic glazing window module of claim 2 wherein the attachment means for attaching the glazing assembly is shielded from exterior view by the generally non-transparent area of the frit film.

5. The plastic glazing window module of claim 1 further comprising radially extending structural ribs unitary with the glazing substrate.

6. The plastic glazing window module of claim 5 wherein the plastic glazing substrate further comprises a circumferential lip having a portion positioned over the ribs, the portion has a cross sectional thickness and the ribs have a cross sectional thickness in the range of about 25–50 percent the thickness of the portion of the lip over the ribs.

7. The plastic glazing window module of claim 6 wherein the structural ribs have a thickness of about 30 percent the thickness of the portion of the lip over the ribs.

8. The plastic glazing window module of claim 1 wherein the non-transparent area of the frit film covers at least a portion of the perimeter of the glazing substrate.

9. The plastic glazing window module of claim 1 wherein at least a portion of the non-transparent area of the frit film is positioned on the interior side of the glazing substrate.

10. The plastic glazing window module of claim 9 wherein at least a portion of the non-transparent area is positioned on the exterior side of the glazing substrate.

11. The plastic glazing window module of claim 1 wherein the exterior surface of the glazing assembly is adapted to be substantially flush with an exterior surface of a motor vehicle.

12. The plastic glazing window module of claim 1 wherein the glazing assembly is curvo-planar shaped.

13. The plastic glazing window module of claim 1 wherein the transparent plastic glazing substrate has first, second, and third curvo-planar portions, each at generally right angles to another of the curvo-planar portions.

14. The plastic glazing window module of claim 13 further comprising an abrasion resistant material coating the glazing assembly.

15. The plastic glazing window module of claim 14 further comprising attachment means for attaching the glazing assembly to a motor vehicle, wherein the generally non-transparent area of the frit film is adapted to hide from exterior view the attachment means and a structural member of a motor vehicle.

16. The plastic glazing window module of claim 13 wherein the first, second and third curvo-planar portions meet at a rounded three-dimensional curve.

17. The plastic glazing window module of claim 16 further comprising an abrasion resistant material coating the glazing assembly.

18. The plastic glazing window module of claim 1 wherein the glazing substrate is polycarbonate plastic.

19. The plastic glazing window module of claim 1 wherein the carrier web is vinyl plastic.

20. The plastic glazing window module of claim 1 wherein the frit film is a sheet of generally transparent polycarbonate carrier web having a thickness sufficient to be semi-rigid in a free state and the non-transparent area comprises a non-transparent dye.

21. The plastic glazing window module of claim 1 wherein the glazing subassembly further comprises an abrasion resistant material coating and bonded to the glazing substrate and the frit film.

22. The plastic glazing window module of claim 21 wherein the abrasion resistant material is an organically modified ceramic which coats and bonds to each surface of the glazing assembly.

23. The plastic glazing window module of claim 1 wherein the frit film covers only a portion of one side of the glazing substrate.

24. The plastic glazing window module of claim 1 wherein the frit film covers the entire interior side of the glazing substrate, and the frit film is non-transparent on at least a portion of the perimeter of the glazing substrate.

25. The plastic glazing window module of claim 1 wherein the frit film further comprises a transparent area and a semi-transparent transition area between the transparent area and the non-transparent area.

26. The plastic glazing window module of claim 1 wherein the exterior surface of the glazing assembly has a uniform gloss.

27. The plastic glazing window module of claim 1 wherein the carrier web is transparent.

28. The plastic glazing window module of claim 1 wherein the carrier web extends in an unbroken annulus around the perimeter of the glazing substrate.

29. A plastic glazing module comprising, in combination:

a transparent plastic substrate;

a frit film positioned on a portion of the glazing substrate having a carrier web with a generally non-transparent area; and an abrasion resistant hardcoat coating and bonded to the plastic glazing substrate and the frit film.

30. A plastic glazing window module for a motor vehicle having an exterior, comprising, in combination:

a glazing assembly having an exterior surface, comprising a transparent plastic glazing substrate having first, second, and third curvo-planar portions each positioned at generally right angles to the another of the curvo-planar portions;

an abrasion resistant material coating the glazing assembly; and attachment means for attaching the glazing assembly to a motor vehicle.

31. The plastic glazing window module of claim 30 wherein each curvo-planar portion has two sides meeting corresponding sides of the other curvo-planar portions in an elongate radiused curve, and the first, second and third curvo-planar portions meet at a rounded three-dimensional curve.

32. The plastic glazing window module of claim 31 wherein the exterior surface of the glazing assembly is adapted to be substantially flush with an exterior of a motor vehicle.

* * * * *